Jan. 16, 1968    A. D. ALEXANDER    3,363,333
TEACHING MACHINE

Filed Sept. 24, 1965    7 Sheets-Sheet 1

FIG. 1

INVENTOR
ARTHUR D. ALEXANDER

BY Robert J. Lasker

AGENT

Jan. 16, 1968  A. D. ALEXANDER  3,363,333
TEACHING MACHINE

Filed Sept. 24, 1965  7 Sheets-Sheet 2

FIG. 2

Jan. 16, 1968  A. D. ALEXANDER  3,363,333
TEACHING MACHINE
Filed Sept. 24, 1965  7 Sheets-Sheet 3

Jan. 16, 1968   A. D. ALEXANDER   3,363,333
TEACHING MACHINE

Filed Sept. 24, 1965   7 Sheets-Sheet 4

United States Patent Office 3,363,333
Patented Jan. 16, 1968

3,363,333
TEACHING MACHINE
Arthur D. Alexander, Owego, N.Y., assignor to International Business Machines Corporation, Armonk, N.Y., a corporation of New York
Filed Sept. 24, 1965, Ser. No. 489,933
3 Claims. (Cl. 35—19)

ABSTRACT OF THE DISCLOSURE

A teaching machine for aiding an operator of said teaching machine to gain familiarity with logic circuit configurations and the operation thereof, said teaching machine comprising a plurality of logic circuits, control means for controlling said logic circuits, universal interconnecting means for selectively interconnecting said logic circuits and said control means in a plurality of different circuit configurations, and identifying means associated with said control means for identifying said plurality of different circuit configurations.

---

This invention relates to teaching machines and more particularly to teaching machines that provide instruction in the necessary skills to properly service, maintain, and modify electronic equipment.

The education of maintenance personnel servicing electronic equipment is a continuing process. The dynamics of automation and the rapid advancement of technological frontiers make ever-increasing demands on the students and instructors of electronic equipment maintenance. These demands have been created by the greater complexity and micro-miniaturization of present equipment as compared with that in use a decade ago.

Since the development of miniaturized solid-state electrical components, the detection of circuit faults by the mere absence of a tell-tale glow in a vacuum tube is no longer practical. The ultra-high speeds at which contemporary circuits function have further compounded the servicing problems as well as the education of the maintence personnel. The increasing complexity, micro-miniaturization, and high-speed operation of present day electronic equipment have made it necessary to infinitely more refine trouble-shooting techniques.

The successful education of maintenance personnel with respect to any specific piece of electronic equipment generally involves specialized training in a number of different, but related, disciplines. An educational maintenance program, including the training equipment utilized, must be designed to familiarize the student with the component part layout of the particular electronic equipment being studied. This is especially true with modular construction wherein a plurality of individual modules (ANDS, ORS, amplifiers, etc.) are arranged on printed circuit cards which are each pluggable into a larger entity known as a "board." The board, having voltage distribution means for powering the modules, represents the basic building block of the electronic device. The above is only one of many specific examples of the manner in which electronic equipment may be constructed. However, regardless of the modes of construction, it is clear that a maintenance training program must provide the student with adequate familiarization of the components of the system as well as their location within the system and their relationship to one another.

The training program must enable the student to become familiar with the particular manner in which voltages and signals are distributed throughout the particular piece of electronic gear. The successful student must acquire and develop skills in locating and correctly identifying the available signals within the system. This aids him in detecting faults as, for example, when short-circuits, open-circuits, etc. exist.

Another very important skill that must be acquired is a familiarization with the operation of the different component parts of the electronic device. An important factor is acquiring such a skill is a familiarity with the input and output waveforms of the different modules or components to determine whether they are functioning properly. As those skilled in the art appreciate, a faulty waveshape is often the sign of a malfunctioning device.

It is also important to acquire a knowledge of the timing and sequence of operation of the particular circuit elements which comprise the electronic equipment. Such a familiarity with the equipment timing facilitates troubleshooting, especially when an oscilloscope is used as an adjunct to the servicing operation.

Another facet of the student's training should focus on developing skills in handling, assembling, and disassembling the component parts of the particular device he is being trained to service. The trend to micro-miniaturization has introduced many new packaging techniques which require special handling and precautionary measures to avoid damaging delicate components and printed circuitry.

It is thus quite apparent that maintenance personnel must acquire numerous skills to effciently and successfully service present-day electronic equipment. The prior art approach to instructing maintenance personnel in the servicing of complex electronic equipment has not been entirely satisfactory. The use of actual field equipment in training programs has many obvious disadvantages, but of considerable importance is the large equipment investment which is necessarily tied-up for training purposes. Students must also be taken from the field to a plant location for training purposes which is expensive in terms of lost travel time, transportation costs, etc. In addition, when working with actual field equipment, student mistakes resulting in circuit overloads, etc., often necessitate costly equipment repairs and down-time. This becomes more apparent when it is realized that field equipment is designed for use by competent operators, not students. Furthermore, an instructor is usually required to supervise the learning process when actual field equipment is used. Another difficulty associated with the use of field equipment for maintenance training purposes is that when it is desired to teach the function of only a portion of the equipment it is often difficult or impossible to operationally isolate the desired and undesired portions. As a result of the cumulative effect of the above-noted disadvantages of the prior art training techniques, the undertaking of necessary training courses in the first instance or, if once undertaken, subsequent refresher courses, have been discouraged.

To a limited extent the prior art has obviated some of the disadvantages associated with utilizing field equipment to train maintenance personnel to service electronic equipment. The use of mock-ups, simulators, breadboards consisting of actual electronic components, etc., has alleviated the problems to some extent, but these problems have not been completely resolved by such techniques. For example, they have generally been characterized by a lack of flexibility in that only one or two skills can be taught with any given machine. Prior art teaching machines have been too specialized and more often than not require the presence of an instructor as they are not designed to be self-teaching. Another serious disadvantage with the prior art teaching devices is their cumbersome size, which not only adds to the cost in building them, but requires the student to come to the teaching machine rather than bringing the machine to the student. Thus, although teaching devices have been developed which do not require the use of field equipment as training aids, numerous difficulties still exist because of their inherent design which depreciates or otherwise detracts from their primary function of training personnel in the maintenance, servicing and modifying of electronic equipment.

Consequently, one object of this invention is to provide a teaching machine for instructing personnel in the skills necessary to service, maintain, and modify electronic equipment which does not have the above-mentioned shortcomings of the prior art.

It is another object of this invention to make an improved compact and portable teaching machine.

A further object is to eliminate the necessity of an instructor's presence to enhance the self-teaching of service maintenance techniques.

A still further object is to provide an improved self-teaching machine that is extremely flexible and adaptable for use in instructing personnel with varying degrees of skill and knowledge.

It is yet another object to utilize actual system components and operate them at speeds comparable to systems used in commercial and business applications in an improved teaching machine.

It is still another object to effectively increase the size and capability of a teaching machine by coupling other similar devices to it.

Numerous advantages result from the use of this invention. For example, the teaching device described herein is relatively inexpensive and simple in construction and yet has capabilities other than as a teaching device. Specifically, it can also be used as a breadboard and printed circuit card tester. It may also serve as an analyzer for existing commercial or business equipment. Finally, the teaching device of this invention is a self-contained, flexible unit requiring no specialized auxiliary equipment, power sources, cooling, etc.

The foregoing objects and advantages are achieved in accordance with one aspect of the invention, by a teaching device which comprises four essential components to instruct students in the service, maintenance, and modification of electronic equipment and systems. The first of these components comprises a plurality of logic circuits each having associated inputs and outputs. The second is a control means which includes an array of switches and indicators having sensing means to represent the electrical condition of a sensed circuit element. The third element is a universal interconnecting means to connect the logical circuits and the control means into an instructive circuit configuration. The logical circuits and control means are selectively interconnected and, via an electrical power distribution network, the resulting instructive circuit configurations are rendered operative. Finally, a plurality of identification means serve to aid in understanding the various circuit arrangements. These identification means are associated with the control means, and more specifically, with the switches and indicators, for the purpose of identifying different ones of them with the different portions of the various instructive circuit arrangements.

The instructive circuits established by the universal interconnecting means enable changes to be introduced into the established circuitry by the student with manipulation of different switches associated with the control means. The student can observe the effect of the changes via the indicators which are identified with different portions of the instructive circuit by the identification means. The operation of the device is further enhanced by providing means for introducing faults into the instructive circuits thereby giving the student an opportunity to "trouble-shoot" and develop his machine servicing capabilities and techniques. The use of this teaching device enables the student to become familiar with different circuit configurations to develop skills useful in maintaining, servicing, and modifying electronic equipment and systems.

The foregoing and other objects, features and advantages of the invention will be apparent from the following more particular description of a preferred embodiment of the invention, as illustrated in the accompanying drawings.

DESCRIPTION

Figure 1:
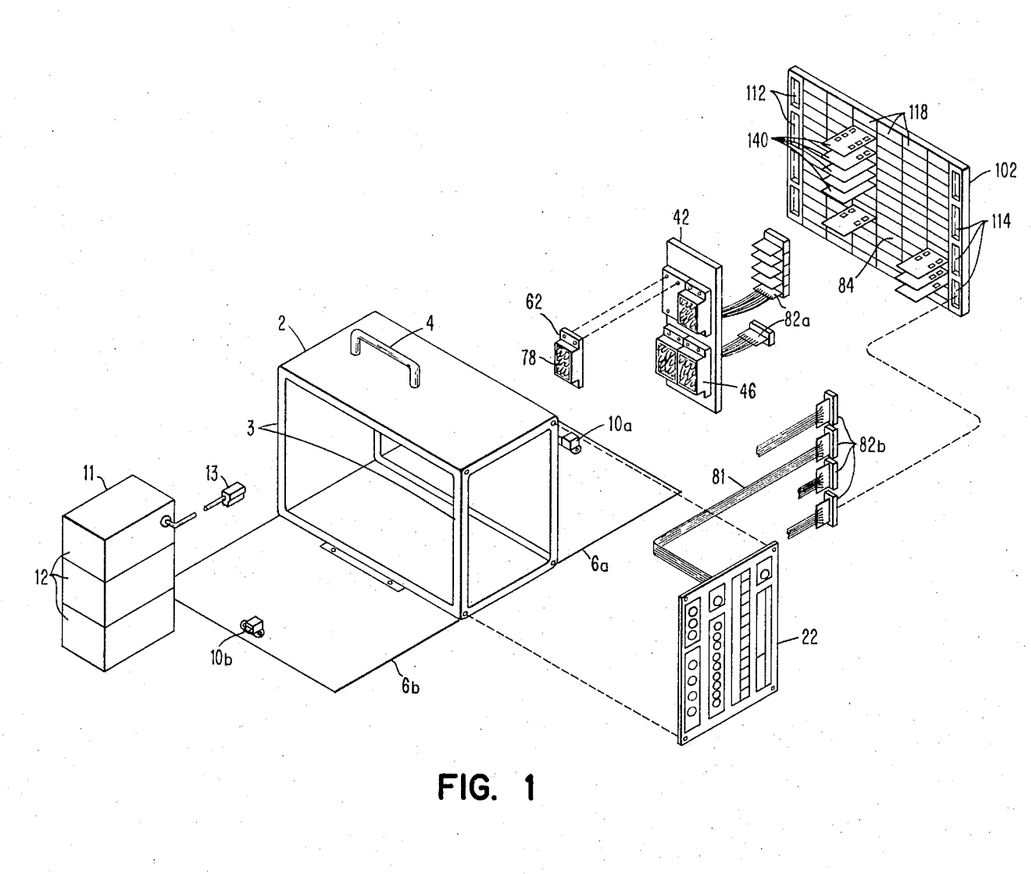
FIG. 1 is an exploded view of the teaching device showing the components of the system in spaced relation.

With reference to FIG. 1, wherein the relationship of the components comprising the system is shown, cabinet assembly 2 houses the various components of the system to be hereinafter described. As the system is designed to be portable, flexible carrying handle 4 is provided to assist the operator in moving cabinet assembly 2 from one location to another. Hinged front cover 6A and back cover 6B enable the operator to have ready access to the system components mounted within the cabinet assembly. Snap latches 10A, 10B secure front cover 6A and back cover 6B, respectively, to the side frames 3 of cabinet assembly 2.

Continuing with FIG. 1, power is provided to the system by a suitable power source 11 which may comprise three 3-volt battery cells 12. Power connection is made to the system components through voltage cross-over connector 13. In an operable system, D.C. battery power source 11 is rigidly mounted as an assembly in cabinet assembly 2 with provision to remove any one or all of batteries 12 when replacement is necessary.

Pluggable switch and indicator panel 22 is mounted to the side of cabinet assembly 2 and serves the dual purpose of a controller and indicator for the operation of the teaching machine.

Miniature connector panel 42 serves as a mounting surface for miniature program connectors 46 and is in turn mounted within cabinet assembly 2 on suitable mounting surfaces (not shown). Miniature program connectors 46 enable the system's operator to control a large number of system functions which are readily alterable through cap jumper connections 78 on removable universal interconnecting means or program caps 62.

Large card or component holder 102 serves as a mounting means for small cards or modules 140 which contain the pulse generation and pulse gating circuitry. Large card 102 comprises a plurality of row by column small card connectors 118 and two columns of signal cross-over connectors 112, 114. Connectors 112, 114, and 118 accommodate signal cross-over cards 82A, 82B and the small cards 140 in their respective positions on large card 102. Large card 102 is mounted within cabinet assembly 2 immediately adjacent to front cover 6A.

Signal cross-over cards 82A, 82B enable signal connections to be maintained between large card 102 and miniature connector panel 42, and large card 102 and pluggable switch and indicator panel 22, respectively.

Figure 2:
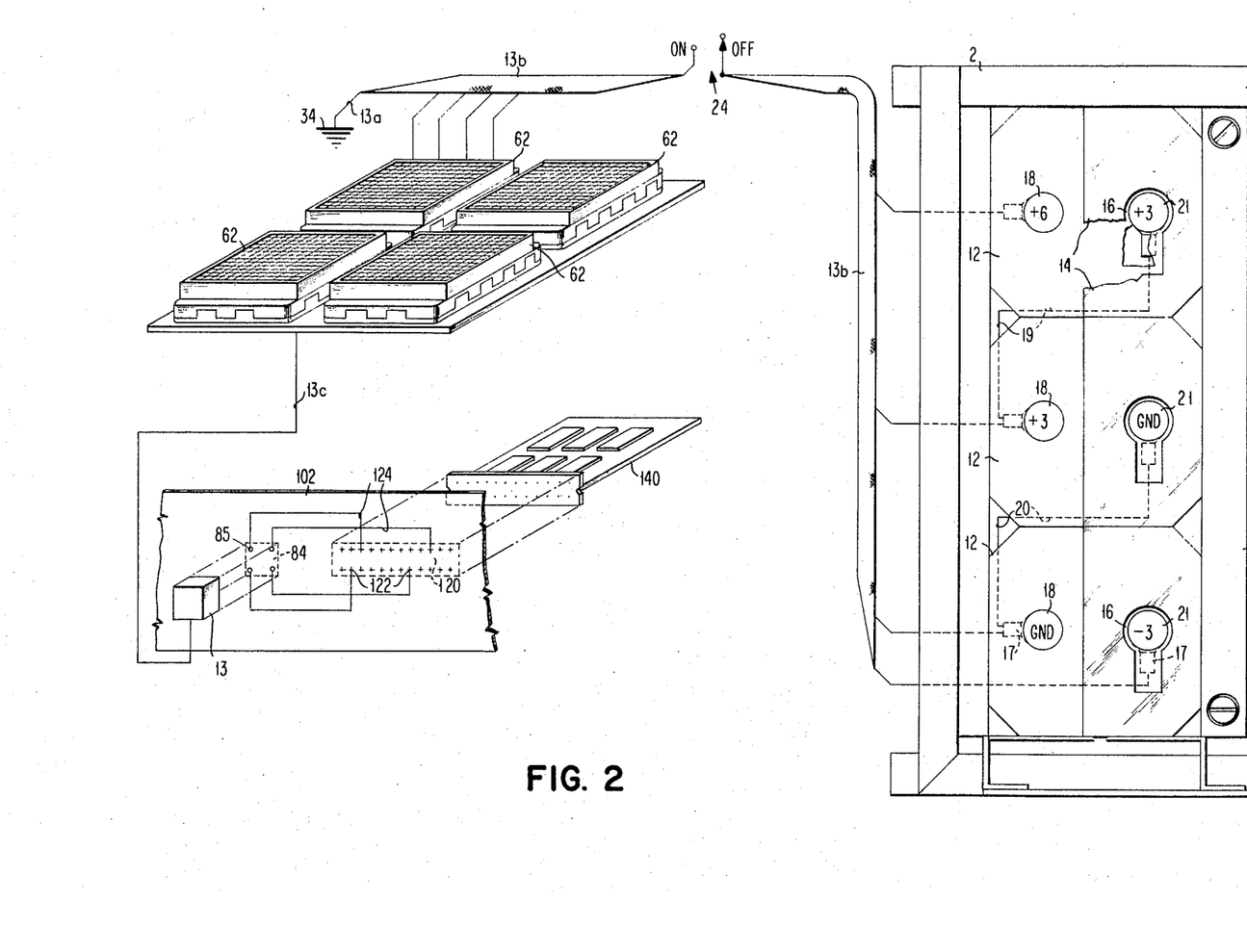
FIG. 2 illustrates the power distribution to certain of the components of the system and also shows details of a battery power source.

With reference to FIG. 2, D.C. battery power source 11, comprising three 3-volt battery cells 12, is mounted within cabinet assembly 2 and held in place by retaining plate 14 which is fastened to bracket 15. Retaining plate 14 has three retaining plate holes 16 in its surface which are positioned to accommodate negative terminals 21 of battery cells 12. Retaining plate holes 16 are shaped to accommodate the negative terminals 21 such that batteries 12 can be mounted within the cabinet assembly to avoid the possibility of an incorrect power interconnection. Positive terminals 18 and negative terminals 21 are serially interconnected by spade lugs 17 and positive and negative cables 19, 20, respectively, to provide +6, +3, and −3 volt operating voltages for the system.

Continuing with FIG. 2, the above-identified voltages plus a reference ground are provided to program caps 62 through power on-off switch mounted on switch and indicator panel 22 indicated by the dotted line. Ground connection 34 is connected to the reference ground via cable 13A to provide a convenient means for grounding auxiliary equipment which may be used with the system. Power cabling 13B interconnects the power on-off switch 24 with program caps 62. The operating voltages are uniquely interlocked, in a manner to be hereinafter described, on program caps 62 and then distributed via power cabling 13C to a voltage cross-over assembly 13 which engages with large card 102. The operating voltages are then distributed to the logic circuitry on small cards 140 by internal voltage printed voltage circuits within large card 102 or wire wrap connections 124 which extend from voltage connector pins 85 on voltage cross-over connector 84 to voltage pins 122 on connectors 120 mounted on large card 102.

Figure 3:
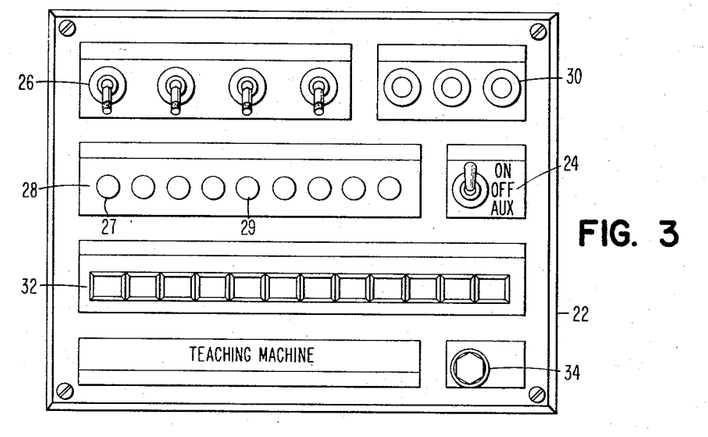
FIG. 3 is a view of the front of the switch and indicafor panel showing the different types of control switches and the positional relationship of the switches and indicators.

With reference to FIG. 3, power to the teaching machine is controlled by power on-off switch 24. There are three stable conditions of this switch, namely, on, off, and an auxiliary position. In the on position, the D.C. power is distributed to the components comprising the device from the internal power source 11 (not shown). In the off position, all power is removed from the machine. The auxiliary position of power switch 24 is provided to permit powering the teaching machine from an external source. This particular position has useful application in situations where several teaching machines are physically located close to one another. Using this auxiliary position, a common power source could furnish D.C. power to several teaching machines. Another possible application for this auxiliary position is to permit powering the device from another system such as a computer.

Continuing with FIG. 3, the four diagnostic switches 26 in the upper left-hand corner provide a means for programming faults or troubles into the logic circuitry. These four toggle switches, comprising diagnostic switches 26 are programmable by means of program caps 62 (FIG. 1). The normally open contact points of these switches may be jumpered in program caps 62 to cause a circuit tie-down when one of them is operated. As will be described more fully hereinafter, circuit defects can be produced in the teaching machine to provide the operator with a faulty circuit operation.

Three momentary switches 30 in the upper right-hand corner are of a push-button type and remain active only while being held depressed. These switches are also programmable through program caps 62 and may serve to start, stop, or reset the various logic circuitry within the teaching machine. These switches may also be used to advance a ring, a binary counter, or any other circuit wherein a momentary contact is necessary or desirable. Nine general purpose indicators 28 are also included on panel assembly 22. General purpose indicators 28 are driven by driver stages and, as their inputs are connected to the program caps 62, any of the nine indicators are under the control of the program cap wiring. These indicators may be wired to indicate the status of any of the logic elements or switches in the teaching machine. The provision of nine indicators permits the display of a byte of information. They may also be used to indicate the status of a register. As the indicator functions are programmable through the wiring on the program caps, one skilled in the art will recognize that the functions capable of being performed by these indicators are limited only by the imagination of the operator. The twelve general purpose switches 32 located in the lower portion of the indicator panel 22 are also programmable through the program caps 62. Each of these switches are individually operable and may be of the push and lock variety. The common points of each of the twelve switches are internally wired together and a single common point is brought to the program caps 62. This common point may be tied to a voltage, another switch, or any of the programmable elements within the teaching machine. The normally closed point of each of the twelve switches also are wired to miniature program connectors 46. The normally closed points are provided so that the depression of any of the twelve switches will decouple that particular switch from its common point. This arrangement enables the general purpose switches 32 to perform a number of different applications which will be described hereinafter. Ground post 34 in the lower right-hand corner is a four-way binding post. It is internally connected to electrical ground and provides a convenient means of grounding auxiliary equipment, such as an oscilloscope, which may be used in conjunction with the teaching machine. Ground post 34 also provides a means for interconnecting several machines with a common ground potential. Switch and indicator panel assembly 22 is removably mounted within cabinet assembly 2 and may be conveniently removed to provide different panel arrangements.

Figure 3A:
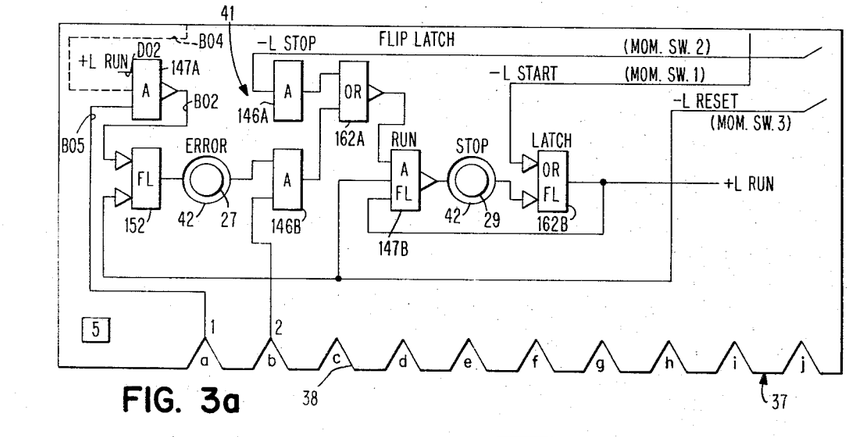
FIG. 3A is a detailed representation of a typical identifying means.

A particular embodiment of an overlay or identification means 37 is shown in FIG. 3A. Overlay 37 comprises a flexible card which can be made from paper stock or plastic material having printed on its surface a logical circuit arrangement 41 and having preselected indicator holes 42 cut from it. Registration means 38 are cut in a triangular pattern in the bottom of overlay 37 in such a manner that individual triangles A-J are associated with individual ones of general purpose switches 32. Overlay 37 can then be placed on switch and indicator panel 22 (FIG. 3) and aligned by registration means 38 such that the student operator can depress indicated ones of general purpose switches 32 in order to initiate a preselected response from a logic circuit.

A logical circuit arrangement is shown on the face of overlay 37 and comprises two flip latches interconnected by associated control circuitry. This arrangement embodies two, three-input AND circuits 147A, 147B; two, two-input AND circuits 146A, 146B; two OR circuits 162A, 162B and a flip latch 152. Flip latch 152 is constructed the same as the two-AND-OR circuits comprising AND circuit 147B and OR circuit 162B shown to the right of flip latch 152 on overlay 37. These aforementioned circuits may comprise logic circuitry known in the art, and preferably circuitry which is identical to that used in a particular system with which the student is to become familiar for the purpose of servicing and maintaining it. This circuit will serve as an example to illustrate the operation of the teaching machine. Its operation will be fully described hereinafter. It should be noted that registration means 38 align the card to indicate to the operator that switches one and two of general purpose switches 32 are to be depressed to complete the internal connections to the circuitry within the machine. Overlay 37 also indicates to the operator error light 27 and "stop" light 29 of indicators 28. Circuit operation is initiated by momentarily depressing momentary switch 1 and stopped by depressing momentary switch 2. The circuit may be reset by depressing momentary switch 3 as indicated on overlay 37. The student operator may introduce a fault in the circuit operation by turning on diagnostic switch 1 which grounds one of the inputs to AND circuit 147A to render it temporarily inoperable.

The actual physical circuits and electrical components are located on small cards 140 (FIG. 1) which in turn are mounted on large card 102 (FIG. 1). The necessary electrical interconnections between the logic circuitry and the various switches on switch and indicator panel 22 are made using signal cross-overs 82A, 82B and program caps 62. These interconnections will be described fully hereinafter.

It is to be emphasized that the circuit shown on overlay 37 is only a typical example of the many possible circuit configurations which can be made in the teaching machine. Those skilled in the art will more fully appreciate the flexibility of the device which is at the command of the student operator. A large part of this flexibility is attained by means of the novel and unique interconnecting means which are available to interconnect the various system components.

Figure 3B:
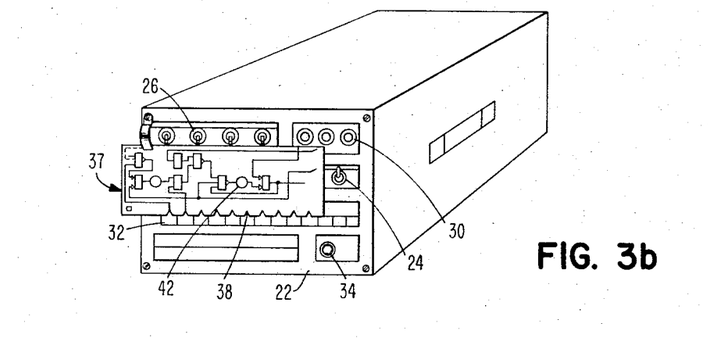
FIG. 3B shows a typical identifying means in an operational position on the switch and indicator panel.

FIG. 3B is an overall view of the teaching machine showing the switch and indicator panel 22 with overlay card 37 mounted in position and registered with general purpose switches 32 and indicators 28 by registration means 38. FIG. 3B thus shows the manner in which overlay cards 37 are placed on switch and indicator panel 22 to be used in operating the device. Those skilled in the art will recognize that many typical logic configurations can be printed on the surface of overlay card 37 along with an indication of which general purpose switches 32 must be depressed to obtain a given logical output. For this purpose, there are, as indicated supra, nine general purpose indicators 28 and twelve general purpose switches 32. As will be described hereinafter, the logical functions performed by the circuitry within the teaching machine can be varied by changing the wiring on program caps 62. Thus, by altering the wiring connections on the program caps 62, the interconnections of general purpose switches 32 and general purpose indicators 28 can be altered. In addition, with a given overlay card 37, the diagnostic switches 26 and momentary switches 30 on the switch and indicator panel 22 can also be used by the operator to introduce short or open-circuit conditions to simulate desired faults in the logic circuitry.

Figure 4:
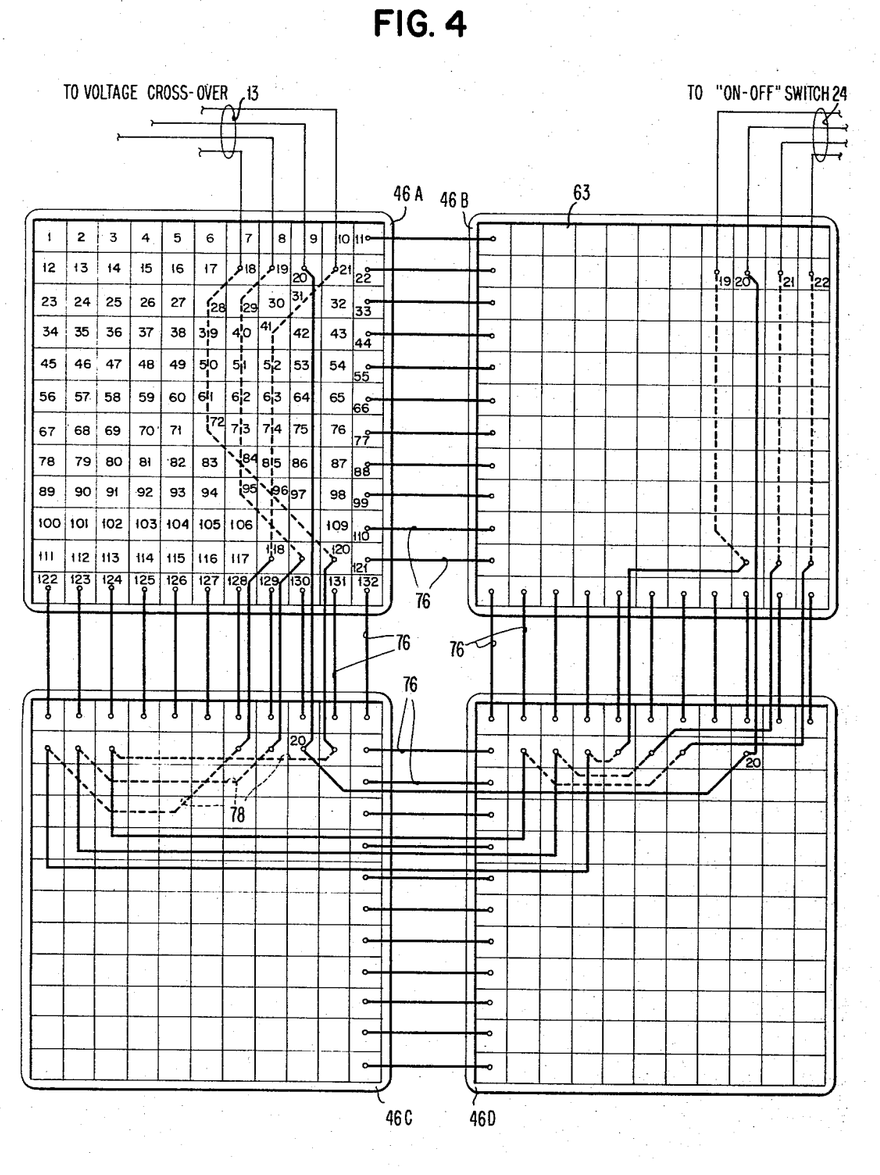
FIG. 4 is a detailed view of a universal connecting means showing the manner of their identification and the plugged interconnections of the D.C. interlock of the power distribution system.

FIG. 4 shows the connector sides of the four miniature connectors 46A, 46B, 46C, 46D and indicates the individual connector pin layout matrices 63 with the proposed lug interconnection and D.C. interlock arrangement to safeguard against accidental circuit overloads and battery drain resulting from improper program cap installation. Each program cap 62 (FIG. 2) has 132 pin connections arranged in a row-by-column matrix 63. As indicated in the figure, the pin connections are consecutively numbered from left to right beginning with the first pin connection in the first row and column of the individual program caps 62.

The necessary operating voltages for the logic circuitry are connected to the program caps 62 from the common terminals of power on-off switch 24 (FIG. 3). In the particular embodiment shown, the power connections are brought from the power on-off switch 24 to the indicated pin connections of miniature program connector 46B.

Specifically, the ground connection is brought from the common ground terminal of power on-off switch 24 to pin location 20 on miniature program connector 46B. In a similar manner, −3 volts, +3 and +6 volts are connected to pin locations 19, 21, and 22, respectively, of miniature program connector 46B. Reference ground is permanently interconnected from pin location 20 of miniature program connector 46B to pin locations 20 of miniature program connectors 46A, 46B, 46C, 46D. In addition, these operating voltages are interconnected between miniature program connectors 46A, 46B, 46C, 46D by program cap jumpers 78 when program caps 62 have been properly installed. These interconnections are indicated by dotted lines on FIG. 4. Communication lines 76 provide auxiliary interconnection between miniature program connectors 46. The operating voltages and reference ground are brought from miniature program connector 46A to voltage cross-over 13 (FIG. 2) which is plugged into large card 102.

Figure 4A:
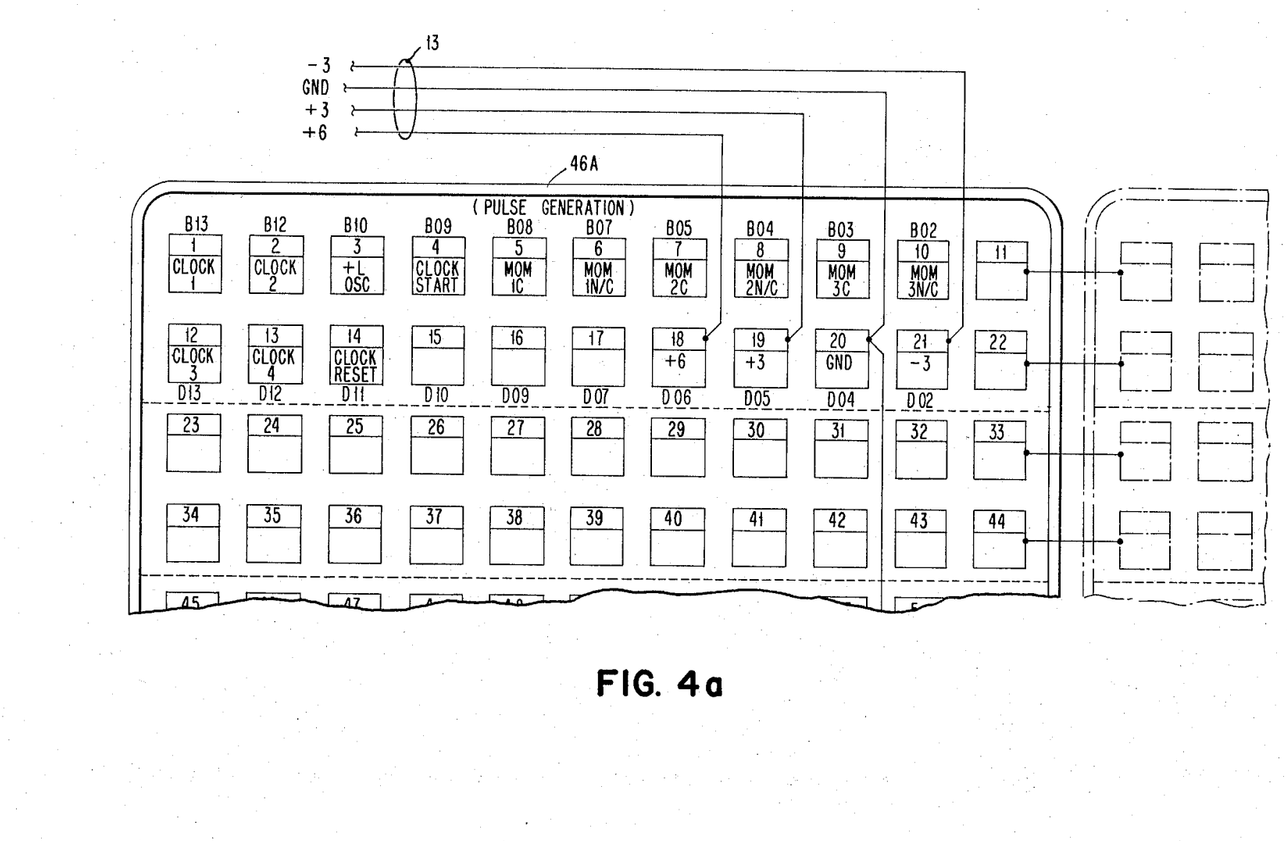
FIG. 4A is a more detailed view of a particular one of the universal interconnecting means.

For the purpose of illustrating the manner in which the logic circuitry of the teaching machine is connected by means of program caps 62, the upper two rows of miniature program connector 46A have, in addition to their pin designations, been identified with their associated logical functions and/or their pin connections to signal cross-over 82A as shown in FIG. 4A. Signal cross-over 82A (FIG. 1) serves to interconnect program caps 62 to the logic circuitry contained on small cards 140 by means of program cap jumpers 78. These functional and pin designation interconnections will be more fully described hereinafter in association with the description of the functional layout of the programmable logical elements. It is to be understood, however, that the remaining pin connections on miniature program connector 46A and the pin designations on miniature program connectors 46B, 46C, and 46D are identified in a manner similar to that indicated for the first two rows of miniature program connector 46A.

Figure 5:
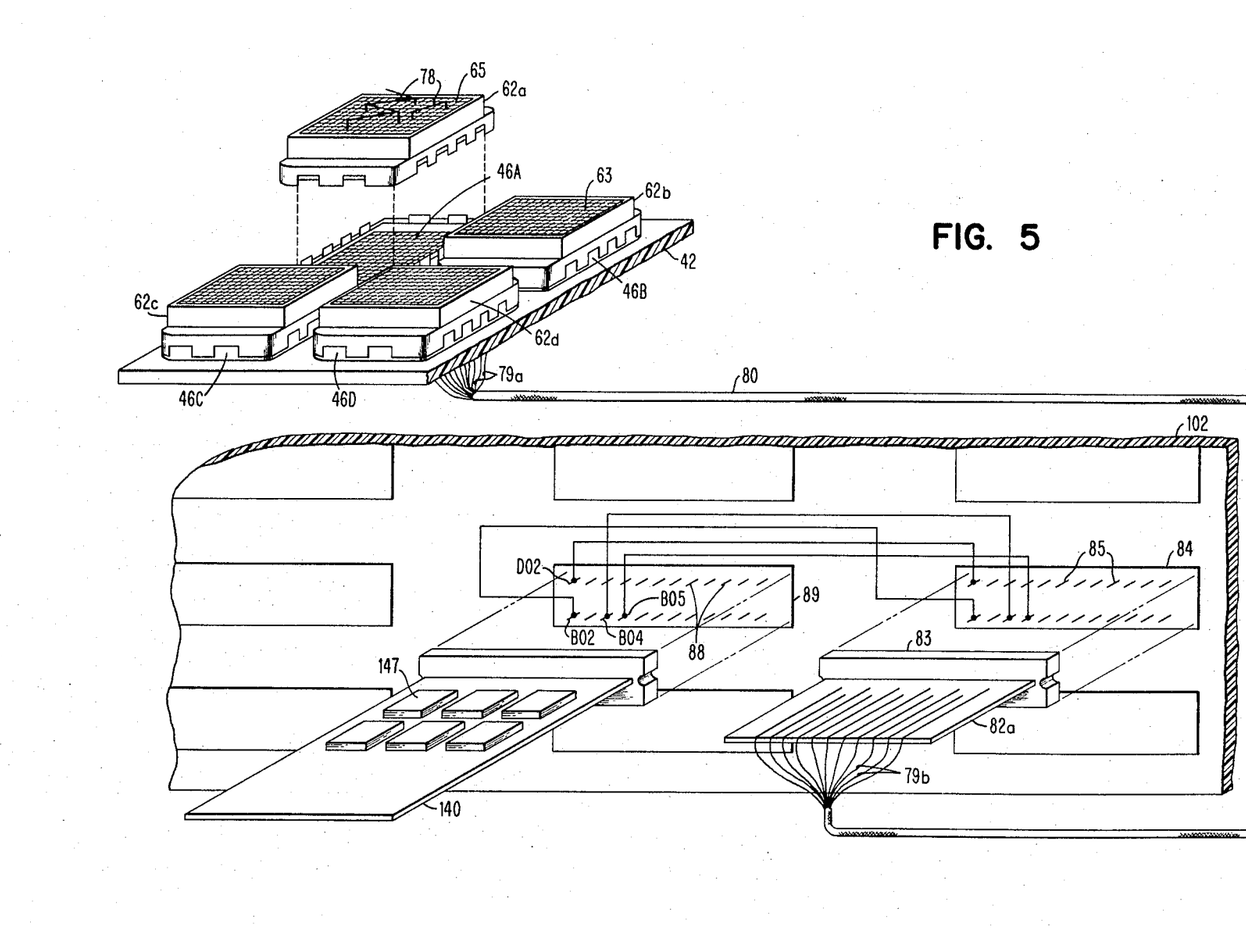
FIG. 5 shows the universal interconnecting means and the manner of signal distribution between the indicated system components.

FIG. 5 shows a diagrammatic representation of the manner in which the operating voltages and signals in the teaching machine are interconnected. In the upper portion of FIG. 5 program cap 62A of miniature program connector 46A is shown disconnected and separated. Program caps 62B, 62C, and 62D are separable and removable in a similar manner. When program caps 62 are plugged into their associated miniature program connectors 46, the complete assembly is mounted within cabinet assembly 2. The electrical connections necessary to provide electrical intercommmunication between program caps 62 and small cards 140 mounted in large card 102 are illustrated in FIG. 5. Wires 79A, which may either be wire-wrapped, crimped, or soldered to the appropriate pin connections on miniature program connectors 46 are brought to the upper portions of signal cross-over 82A via cable 80. Signal connections 79B at the top of signal cross-over 82A correspond to electrical connections 79A at miniature program connectors 46. Signal connections 79B are then extended the length of signal cross-over 82A to connector 83 which is pluggable into receptacle 84 in large card 102. Pins 85 of receptacle 84 are then wired to their appropriate pin locations 88 in small card receptacle 89 to complete the interconnection of the program cap signal voltages to the logic circuitry mounted on small cards 140. These connections may be either soldered, wire-wrapped or attached by slip-on connectors. Those skilled in the art will recognize that various connection means may be employed to enable the operator to readily change the interconnections between signal cross-over 82A and small cards 140.

Switch and indicator panel 22 (FIG. 1) is connected into the system as follows. As shown in FIG. 1, cable 81 connects switch and indicator panel 22 to signal cross-over 82B. The switch and indicator connections are brought to connectors 84 on large card 102 in the same manner as were the signal voltages described above. These connections can be extended to miniature program connectors 46 by interconnecting the appropriate pin locations on connectors similar to connectors 84 and 89 on large card 102.

The functional and operating signals of the logic circuits mounted on small cards 140 are brought to the program caps 62 through the signal cross-over 82A in the manner described above. The primary function of signal cross-over 82A is to provide interconnection between the program caps 62 and the logic circuitry mounted on small cards 140 without obstructing the connector side of large card 102. Those skilled in the art will recognize that if signal cross-over 82A was not provided the signal connections from small card receptacle 89 to program caps 62 would clutter up large card 102 to the extent that the logical signals appearing at small card receptacles 89 could not be probed by the operator. This would introduce a serious limitation on the logic simulator's ability to instruct the student operator as it is essential to his training to be able to probe these logic function signals. In addition, if the signal interconnections were made directly from the small card receptacles 89 to the program caps 62 the length of wire necessary to make the interconnection would be such that the logical signals would be degraded. Direct wiring between miniature program connectors 46 and the logic circuitry on small cards 140 would seriously limit the teaching machine's capability to handle actual system circuitry because minimum and relatively equal conductor wire lengths are extremely important at high speed circuit operation.

The logic signals which have been extended to the program caps 62 from small cards 140 are interconnected by jumpers 78 on program caps 62. Jumper 78 may comprise lengths of wire which are arranged in a saw-tooth configuration and having crimp-type contacts attached to the apexes of the saw-tooth. The crimp-type contacts are designed to be firmly pluggable into apertures 65 of the 132 element matrix 63 of each program cap 62. The connections made by the crimp-type contact into apertures 65 are readily removable from the program caps 62 such that the signal interconnections made on program caps 62 can be readily altered. It is apparent to one skilled in the art that the use of such program cap jumpers 78 with the program caps 62 in the manner described herein enables the student operator to alter the logical configurations in such a manner to produce a wide variety and range of circuit operations with a fixed number of logic circuits.

Figure 6:
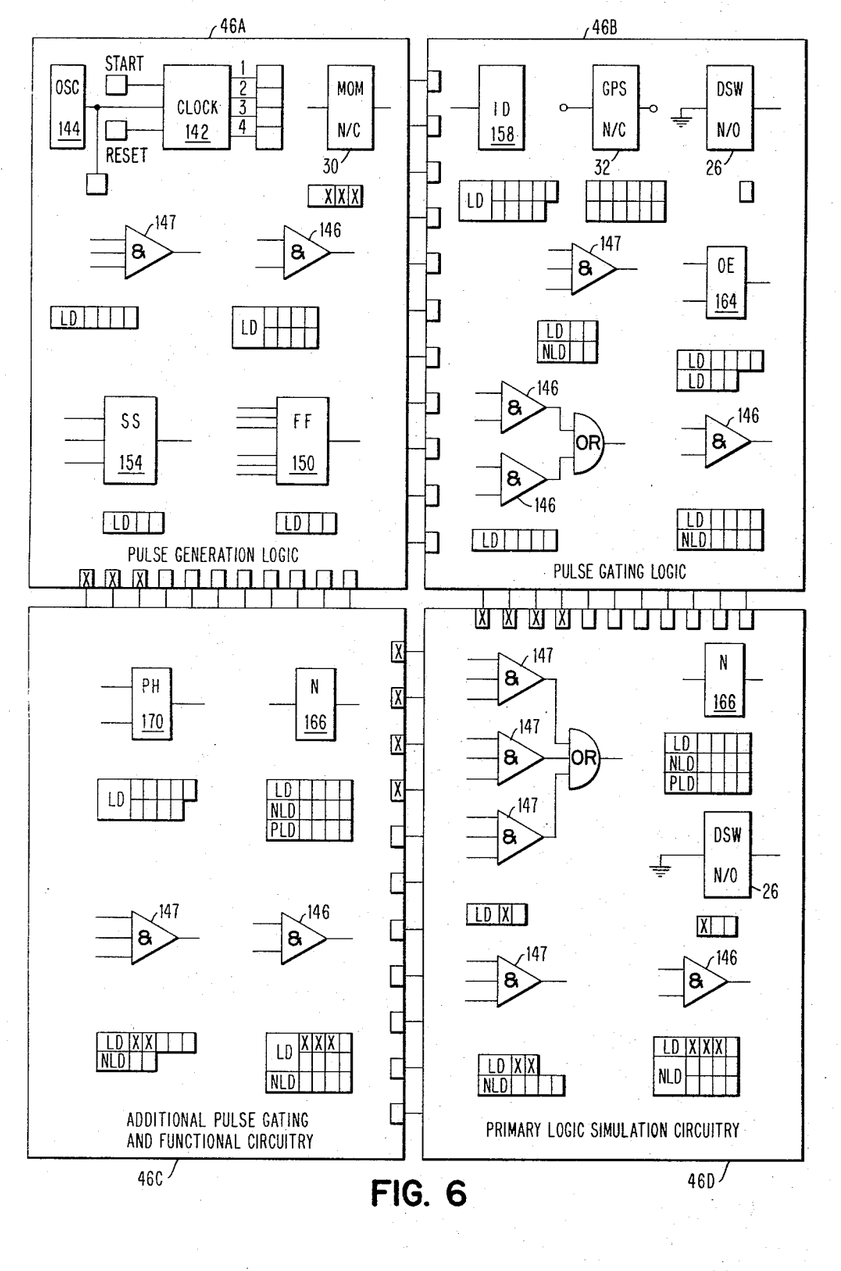
FIG. 6 is a diagrammatic representation of an embodiment showing the universal interconnecting means and the manner in which a typical, logical configuration is established on such means for interconnection into the system.

FIG. 6 shows a functional layout of the programmable logic elements in the teaching machine. The figure is divided into four sections, each rectangular section representing one of the 132 position miniature program connectors 46 (FIG. 1). The upper-left section of FIG. 6 shows the programmable elements contained within program cap connector 46A. The rectangle at the top identified as momentary represents the three momentary switches 30 on the switch and indicator panel 22. The three small squares shown directly below the block indicate that three of these switches are available for programming. Each of the momentary switches 30 occupy two contact positions of the miniature program connector 46A; one contact being the common point and the other contact being the normally closed point. In a similar manner, two configurations of "AND" circuits are shown directly below the momentary switches 30. AND circuit 147 in the left-hand configuration represents a three-legged AND circuit; the right-hand AND circuit 146 is two-legged. The small squares below these configurations indicate that there are four three-legged AND circuits and eight two-legged AND circuits available for programming. The block identified as SS represents a single-shot circuit 154; the two small squares immediately below indicate that two single-shot circuits are available for programming. The LD in the small squares immediately to the left of the blank squares, indicate that load resistors are available for these circuits. Continuing in this fashion, the block identified as FF represents a flip-flop or A.C. set trigger 150. Two of these A.C. set triggers are available for programming. The above-identified programming facility in miniature program 46A may be interconnected and used as pulse generation logic. In addition, as indicated by the blocks 142, 144 in the upper left-hand corner of this section, a clock is available. The four small squares to the right of the clock identify four clock pulses which are all programmable. The three input blocks to the left of the clock 142 represent programmable clock control lines identified as start, reset, and an internally wired drive pulse from oscillator 144. The blank square connected to oscillator 144 indicates that it is programmable. The pulse generation logic contained in miniature program connector 46A develops specific timed pulses which may be programmed to the other logical elements of the teaching machine. These pulses may be gated with the available circuitry in miniature program connectors 46A, 46B, 46C, 46D by jumpers 78 in program caps 62.

Continuing with FIG. 6, block 158 in the upper left of miniature program connector 46B identified as ID represents the indicator drivers for the lamps of indicators 28 contained on switch and indicator panel 22 (FIG. 3). The figure indicates that nine indicator drivers are available and that each is individually programmable. Block 32 identified as GPS represents the twelve common and normally closed points of the general purpose switches contained on the switch and indicator panel. Block 26 identified as DSW indicates that one of the diagnostic switches 26 is available in miniature program connector 46B. The ground symbol associated with the DSW block designates that the common side of the diagnostic switch is permanently wired to ground. The normally opened point of this switch is available at the program cap to be jumpered to any of the other logic elements.

The remainder of the logic circuitry indicated in miniature program connector 46B may be used for additional pulse gating to further complement the pulses generated within miniature program connector 46A by jumpers 78 of program caps 62. For example, four three-legged AND circuits 147 are programmable; the schematic blocks LD and NLD indicate that two of the circuits have load resistors in their collector circuits and two circuits do not have load resistors in their collector circuits, respectively. The block identified as OE represents exclusive OR circuitry 164. Six of these circuits are programmable in miniature program connector 46B, all having load resistors in their respective collector circuits.

Referring now to miniature program connector 46C, the block identified as PH in the upper left-hand section represents polarity hold circuitry 170. Nine of these PH blocks are available to serve as nine-bit position storage register. These PH blocks may be programmed to serve either as a register or they may function independently as exclusive OR latches. A block identified by N represents inverter circuitry 166 with eight inverters available for programming. The squares below the N block indicate the distribution of loaded and unloaded inverters. The four squares identified as PLD identify four programmable resistors which may be used as loads for either the unloaded inverters or may be used as independent loads for other logic blocks. Seven three-legged AND circuits 147 are available; five of which have load resistors, and two of which have no load resistors. Twelve two-legged AND switches 146 are available; eight having loads, and four not having loads. This particular arrangement of logic blocks is particularly useful for additional pulse gating to complement the clock pulses available in program cap 62A. Those skilled in the art will recognize that this assortment of logic blocks may be programmed for a multiplicity of functions.

With reference to miniature program connector 46D, the arrangement of interconnected logic blocks in the upper left-hand portion may be termed as a three-legged, three-way AND/OR inverter. Two circuits of this configuration are available, both having load resistors in their collective circuits. Eight inverter circuits 166 are available as in miniature program connector 46C. Six three-legged AND circuits 147, with two having loads and four being unloaded, are available. The three remaining diagnostic switches 26 provide the capability to program troubles or faults on the simulated logic. In the lower right portion of miniature program connector 46D, a mixture of loaded and unloaded two-legged AND circuits 146 are indicated. The availability of the logic blocks shown in miniature program connector 46D enables a wide range of simulated logic to be programmed. This simulated logic may be activated by using the basic timing pulses from the pulse generation logic circuitry which may be provided on small cards 140 and which is interconnected by means of jumper connections made on program cap 62A (FIG. 5); and gating these pulses with logic elements contained on small cards 102 and also interconnected by jumpers on program caps 62B, 62C or 62D. In such a manner many logical configurations may be assembled by suitable jumper connections on program caps 62.

The following table indicates the above-described capacity of the logic simulator which is presented to indicate a typical logical circuit capacity of the teaching machine.

TABLE 1

111 logic configurations
8 load resistors
4 timing pulses
1 oscillator pulse
1 clock reset line
1 clock start line
12 general purpose push-to-lock switches
4 diagnostic toggle switches
3 momentary switches
44 communication lines, plus voltages and interlocks The X's in certain of the blocks in FIG. 6 indicate the circuitry used in the example to describe the operation of the teaching machine.

OPERATION

The operation of the teaching machine will be described using as an example the logic circuitry shown on overlay card 37 (FIG. 3A). Reference will also be made to FIGS. 3A, 3B, 5 and 6.

The circuits for the flip latch circuits shown on overlay card 37 are physically contained on small cards 140 which are pluggable into large card 102. The operating voltages, input signals and output signals of these circuits are provided to suitable pins on connectors 89 (FIG. 5) and these pins are then wired to the signal cross-over connector pins 85 on cross-over connectors 84. Wires 79B then extend these signals, via cable 80, to miniature program connector 46D. The necessary wire connections 78 are then made on program caps 62A, 62B, 62C, 62D to interconnect the individual logic circuits into a meaningful circuit such as the flip latch.

Table 2 below indicates the necessary interconnections to be made by program cap jumpers 78 on program caps 62 to provide the operable flip latches shown on overlay card 37.

TABLE 2

| Program Cap | Pin Connection | Function |
|---|---|---|
| 62A | 18 to 120 | +6 V Interlock. |
|  | 19 to 119 | +3 V Interlock. |
|  | 21 to 118 | −3 V Interlock |
|  | 20 to 9 | Puts ground on common of momentary switches 1, 2, 3. |
|  | 9 to 5 to 7 |  |
|  | 6 to 123 | Converts momentary switch 1 to communication line. |

TABLE 2—Continued

| Program Cap | Pin Connection | Function |
|---|---|---|
|  | 8 to 124 | Converts momentary switch 2 to communication line. |
|  | 10 to 122 | Converts momentary switch 3 to communication line. |
| 62B | 19 to 119 | −3 V Interlock. |
|  | 21 to 120 | +3 V Interlock. |
|  | 22 to 121 | +6 V Interlock. |
|  | 11 to 20 | Puts ground on common GP switch. |
|  | 14 to 124 | Connects GP switch 2 to communication line. |
|  | 122 to 13 | Connects GP switch 1 to communication line. |
|  | 123 to 2 | Connects error latch output to indicator 1. |
|  | 125 to 6 | Connects run latch output to indicator 5. |
| 62C | 12 to 18 | −3 V Interlock. |
|  | 13 to 19 | +3 V Interlock. |
|  | 14 to 21 | +6 V Interlock. |
|  | 98 to 55 to 89 | Connects run latch (Connects two ANDS) to indicator 5. |
|  | 91 to 95 to 33 | Connects run latch output to sample logic block. |
|  | 94 to 124 | Connects converted momentary switch 2 to run latch reset. |
|  | 3 to 92 | Connects momentary switch 2 from communication line. |
|  | 2 to 107 | Connects momentary switch 1 from communication line. |
|  | 1 to 104 | Connects momentary switch 3 from communication line. |
|  | 108 to 102 | Connects converted momentary switch 1 to turn on run latch. |
|  | 106 to 96 to 44 | Connects converted momentary switch 3 to reset run and error. |
|  | 109 to 22 | Connects run latch reset. |
| 62D | 13 to 18 | +6 V interlock. |
|  | 14 to 17 | +3 V Interlock. |
|  | 15 to 16 | −3 V Interlock. |
|  | 19 to 53 | Connects trouble-diagnostic switch 1. |
|  | 20 to 113 | Applies ground to unused circuit. |
|  | 3 to 62 | Connects GP switch 2 from 62B Cap. |
|  | 51 to 130 | Connects converted GP switch 2. |
|  | 66 to 23 | Connects top leg of sample AND (run latch). |
|  | 52 to 65 | Connects bottom leg of sample AND (converted GP switch 1). |
|  | 54 to 1 | Connects GP switch 1 from communication line. |
|  | 55 to 50 | Connects output of sample AND to error latch. |
|  | 61 to 48 | Connects error latch. |
|  | 47 to 63 to 2 to 120 | Connects error latch output to reset run latch. |
|  | 12 to 129 | Connects run latch reset. |
|  | 45 to 4 | Connects run latch output to communication line (indicator 5). |
|  | 34 to 46 | Connects error latch reset from communication line (momentary switch 3). |

AND circuit 147, shown in the upper left-hand corner of overlay 37 (FIG. 3A), will serve as an example of the manner in which the universal interconnection means provide the necessary electrical interconnections between the system components. As shown in FIG. 5, the aforesaid AND circuit 147 is physically mounted on small card 140 which, in turn, is mounted on large card 102. The respective inputs to AND 147 appear at pin terminals DO2, BO4, and BO5 of small card connector 89. Similarly, the output of AND 147 appears at pin terminal BO2 of small card connector 89. The input and output connections are extended from small card connector 89 to signal cross-over connector 84, and, specifically, to the designated pin terminals 85 of that connector. These connections are then extended to program cap 62D by wires 79B, via cable 80. Wires 79A, connect to specific terminals on the fixed miniature program 46D connector such that when program cap 62D is inserted in fixed connector 46D the input and output terminals of AND circuit 147 can be electrically extended to other components of the system by means of jumpers 78. The following table presents the necessary connections that must be made to operably interconnect AND 147 into the system.

TABLE 3

| AND 147 | Small Card Connector 89 | Signal Cross-Over Connector 84 | Miniature Program Connector 46D |
| --- | --- | --- | --- |
| Input 1 | DO2 | DO2 | 66 |
| Input 2 | BO4 | BO4 | 53 |
| Input 3 | BO5 | BO5 | 52 |
| Output | BO2 | BO2 | 55 |

The other circuitry indicated on overlay 37 is connected into the system in a manner similar to that described above for AND 147. Once the necessary jumpers 78 have been inserted, the program caps 62A, 62B, 62C, 62D are inserted in their respective miniature program connectors 46 (FIG. 5). Power is then applied to the components by turning on power on-off switch 24 (FIG. 3).

The operator follows the directions printed on overlay 37 and activates general purpose switches 32 numbers one and two. Circuit operation is initiated by momentarily depressing momentary switch 30 number one. Back cover 6A (FIG. 1) can then be opened to expose the pin terminal side of large card 102 which enables the operator to probe the various functional signals of the flip latch. These signals may be placed on the appropriate sweeps of an oscilloscope such that the student may observe the waveforms to gain familiarity with the system operation.

The depression of momentary switches 30 numbers two and three, respectively, will stop or reset the flip latch operation. When momentary switch 30 number two is depressed, indicator light 28 will light through hole 42 (FIG. 3A) to indicate the operation.

A fault can be introduced into the operation of the flip latch by engaging diagnostic switch 26 number one. The activation of switch 26 number one grounds input number two to AND 147 which prevents the flip latch from turning on. This fault prevents the normal detection of errors while the circuit is in operation. The ability to readily introduce such faults into the various circuit configurations enables the operator to recognize incorrect circuit functioning and thus provides him with invaluable experience in increasing and developing trouble-shooting techniques, as those skilled in the art will readily appreciate. A wide variety of circuit malfunctions are capable of being introduced by means of the afore-mentioned jumper connections on program caps 62 which interconnect any or all of diagnostic switches 26 to any input or output of the logic circuitry such that the operation of a particular one of diagnositic switches 26 causes a particular input or output to be tied to ground.

Those skilled in the art will further appreciate that the student neophyte may also learn to design logic circuits because with the inventive teaching machine he may readily interconnect different logic through the universal interconnection means described above. The student may be aided in this task by providing him with tables containing the pin connections of the various logic circuit inputs and outputs. The student operator then need only remove the necessary program caps 62 and make appropriate circuit interconnections using jumpers 78. Once the program caps 62 are re-inserted, the operator may study the operation of the new circuit configuration with the aid of additional overlay cards 37 which will indicate what switches to depress on switch and indicator panel 22 such that the circuit operation may be modified as desired.

It will be apparent to those skilled in the art that the teaching invention disclosed herein has the capability of performing many additional operations other than those described, supra. For example, the teaching device may be used to test actual circuit modules for their functional operation within given design specifications. In such an operation the card to be tested would be inserted in large card 102. An overlay card 37 could be designed to indicate to the operator what tests are to be performed. The circuit to be tested could be exposed to various conditions that would be programmed into the teaching machine via the universal interconnection means under control of the switches on switch and indicator control panel 22. The indicator lights could be connected to present a visual indication of the circuit performance under various operating conditions. If a permanent record of the performance were desired, the indicator driver outputs could be connected to drive a printer. The capacity of the teaching machine would enable more than one circuit to be tested simultaneously, and, moreover, the flexibility of the machine would enable more than one type of circuit to be tested at a time.

As another example, the teaching machine could be programmed to analyze an existing system such as a computer or any other piece of electronic gear to determine and locate a particular equipment malfunction. To perform such a function, the logic circuitry of the machine could be connected to receive typical signals from the system being analyzed and, using such signals as inputs, perform the necessary logical operations to locate malfunctions. The teaching machine could be programmed to indicate such a malfunction by means of the indicator lights or else by providing printer drive signals as in the prior application. The diagnostic switches, momentary switches, and general purpose switches could be connected such that different combinations or a multitude of signals could be tested without the necessity of rewiring connections. In such applications the device would be particularly suitable to check for intermittent failures in a system as it could be programmed to stop when a malfunction was indicated and also indicate just what had caused such malfunction.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A teaching machine comprising:
 a plurality of logic circuits each having input and output leads for transmitting electrical signals;
 control means for controlling said logic circuits;
 universal interconnecting means for selectively interconnecting said logic circuits and said control means in a plurality of different circuit configurations;
 said universal interconnecting means comprising
  cross-over means for receiving and distributing said electical signals on said input and output leads of said logic circuits to and from said control means,
  program connector means for receiving and distributing electrical signals between said control means and said cross-over means to provide a readily alterable means of changing the electrical interconnections to provide a plurality of different circuit configurations;
   said program connector means comprising a connector mounted to said teaching machine for receiving said electrical signals signals from said logic circuits, a receptacle having a row by column matrix of electrical connector elements, said receptacle being pluggable into said connector means such that it is readily removable from said connector means, and flexible jumper cable means which are pluggage into said electrical connector elements and readily removable therefrom to provide a flexible means of altering the electrical interconnections between said logic circuits and said control means;
  said program connector means characterized by being divided into a plurality of independent subsections such that individual ones of said plurality of subsections may be removed and substituted with other subsections without altering the remaining subsections; and identifying means associated with said control means for identifying the plurality of different circuit configurations, whereby, said logic circuits are caused to operate as an instructional teaching device to provide the operator with a means to gain familiarity with different circuit configurations and their operation.

2. The teaching machine as in claim 1 wherein said connector means are interconnected by communication lines for intercommunication between said plurality of subsections to provide independent electrical communication between said plurality of subsections.

3. The teaching machine as set forth in claim 1 wherein said identifying means further comprises:

a flexible overlay card which is adapted to be placed on said control means to indicate to the operator the control functions to be activated to operate the teaching machine in a particular preselected one of the different circuit configurations, said overlay card having registration means to align it on said control means, and said overlay card having printed on its surface a schematic diagram of the particular circuit configuration interconnected by said universal interconnecting means, whereby the operation of said control means is facilitated.

References Cited
UNITED STATES PATENTS

| | | | |
|---|---|---|---|
| 3,011,269 | 12/1961 | Thompson | 35—19 |
| 3,071,876 | 1/1963 | Swanberg | 35—19 |
| 3,278,736 | 10/1966 | Pastoriza. | |
| 3,309,793 | 3/1967 | Bartee | 35—10 |
| 3,310,883 | 3/1967 | Young | 35—10 |

EUGENE R. CAPOZIO, *Primary Examiner.*

H. S. SKOGQUIST, *Assistant Examiner.*